Patented Dec. 19, 1944　　　　　　　　　　　　　　　　　　　2,365,623

UNITED STATES PATENT OFFICE 2,365,623

PREPARATION OF DIHYDROPYRAN

John George Mackay Bremner and Donald McNeil, Norton-on-Tees, England, assignors to Imperial Chemical Industries Limited, a corporation of Great Britain No Drawing. Application December 31, 1941, Serial No. 425,204. In Great Britain February 21, 1941

4 Claims. (Cl. 260—333)

This invention relates to the production of 1:2-dihydropyran from tetrahydrofurfuryl alcohol.

It is already known to prepare 1:2-dihydropyran by passing tetrahydrofurfuryl alcohol in the vapour phase over alumina at a temperature of 370° C.-380° C., whereby a 42% yield of 1:2-dihydropyran is obtained. Under the conditions used, 84% of the alcohol reacted. The process has also been carried out in the presence of thoria, when results similar to those obtained with alumina were obtained.

We have now found that improved yields of 1:2-dihydropyran can be obtained by subjecting tetrahydrofurfuryl alcohol in the vapour phase to the action of a catalyst comprising as its essential component alumina-aluminium phosphate, frequently referred to as basic aluminium phosphate.

The invention is illustrated but not limited by the following example.

Example

Basic aluminium phosphate was prepared by mixing 3.4 litres of aluminium sulphate solution containing 61.4 gms of alumina at 32° C. with 3 litres of a soda ash-sodium phosphate solution containing 136 gms. of soda ash and 14.3 gms. of disodium phosphate at 60° C. The precipitate was then allowed to settle, decanted, diluted back to the original volume, filtered and washed. The filtered pulp was then dried and pulverised to a fine powder, 85% to 90% of which passed a No. 100 British Standard fine mesh sieve. Some of the basic aluminium phosphate so prepared was mixed with about 2% of graphite, pelleted and calcined at about 450° C. for about 8 hours.

One hundred cubic centimetres of the catalyst prepared as described above was placed in a "Pyrex" glass tube and commercial tetrahydrofurfuryl alcohol (boiling point 168.5-178.5° C.) was passed over it at the rate of 50 ccs. of alcohol (measured as liquid) per hour. The converter tube was enclosed in an electric furnace and the catalyst zone maintained at 350° C. throughout. The product on condensation separated into an upper greenish coloured layer and a lower aqueous layer. The upper layer was separated, dried with anhydrous sodium sulphate and distilled. The percentage conversion per passage was greater than 98% and the yield of 1:2-dihydropyran was 65%. The 1:2-dihydropyran obtained boiled between 84° C. and 86° C. and had a density $d^{20}{}_4 = 0.929$ and a refractive index $n^{20}{}_D = 1.4400$.

The 1:2-dihydropyran has a structure corresponding to that derived by introducing two H atoms at one of the double bonds of 1:2 pyran. 1:2 pyran will be understood to have the structural formula

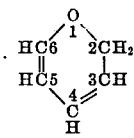

The 1:2-dihydropyran is believed to have the structure

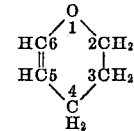

The basic aluminium phosphate prepared as described in the example has no definite chemical composition. By analysis it has been found to have the following average and range compositions:

|  | Average | Range |
|---|---|---|
|  | Per cent | Per cent |
| $Al_2O_3$ | 36 | 31–38 |
| $P_2O_5$ | 15 | 11–17 |
| $Al_2O_3/P_2O_5$ | 2.4 | 1.8–3.5 |
| Ignition loss at 1150° C | 46 | 41–54 |
| Water content | 38 | 35–45 |
| $SO_3$ | 8 | 5–13 |
| $Na_2SO_4$ | 1.5 | 1–3 |
| Fe | 0.2 |  |

Basic aluminium phosphate to be used as a catalyst in this invention may be prepared by any method producing a mixture containing alumina and aluminium phosphate, which are the active constituents of the catalyst. The alumina and aluminium phosphate are preferably co-precipitated from solution, suitable methods for which include: treating a solution of an aluminium salt with an excess of alkali phosphate; digesting normal aluminium phosphate with aqueous ammonia; acting with ammonia on a solution of aluminium phosphate in hydrochloric acid or other mineral acids. Alternatively, alumina and normal aluminium phosphate which have been prepared or obtained separately, may be mixed together.

The reaction may be carried out over a wide range of temperatures from about 200° C. to about 500° C. depending on the time of contact with the catalyst. The shorter the time of contact, the higher may be the temperature. The time of contact required with any given operating temperature in order to obtain a given percentage conversion and a given yield may readily be determined by experiment.

We claim:

1. A process for the production of a 1:2-dihydropyran which comprises subjecting tetrahydrofurfuryl alcohol in the vapour phase and at a temperature between 200° C. and 500° C. to the action of a catalyst consisting essentially of a mixture of alumina and aluminium phosphate in which the ratio by weight of $Al_2O_3/P_2O_5$ is between 1.8 and 3.5.

2. A process for the production of a 1:2-dihydropyran which comprises subjecting tetrahydrofurfuryl alcohol in the vapour phase and at a temperature between 200° C. and 500° C. to the action of a catalyst consisting essentially of a mixture of alumina and aluminium phosphate in which the ratio by weight of $Al_2O_3/P_2O_5$ is between 1.8 and 3.5 prepared by co-precipitation from solution of alumina and aluminium phosphate.

3. A process for the production of a 1:2-dihydropyran which comprises subjecting tetrahydrofurfuryl alcohol in the vapour phase and at a temperature between 200° C. and 500° C. to the action of a catalyst consisting essentially of a co-precipitated mixture of alumina and aluminium phosphate in which the ratio by weight of $Al_2O_3/P_2O_5$ is between 1.8 and 3.5.

4. A process for the production of a 1:2-dihydropyran which comprises subjecting tetrahydrofurfuryl alcohol in the vapour phase and at a temperature between 200° C. and 500° C. to the action of a catalyst consisting essentially of a precipitated mixture of alumina and aluminium phosphate in which the ratio by weight of $Al_2O_3/P_2O_5$ is about 2.4.

JOHN GEORGE MACKAY BREMNER.
DONALD McNEIL.